United States Patent [19]

Fukuo et al.

[11] Patent Number: 4,753,759

[45] Date of Patent: Jun. 28, 1988

[54] MICROCAPSULE MANUFACTURE

[75] Inventors: Hidetoshi Fukuo, Osaka; Tomio Onoguchi, Tokyo, both of Japan

[73] Assignee: Sakura Color Products Corp., Osaka, Japan

[21] Appl. No.: 892,783

[22] Filed: Aug. 1, 1986

[30] Foreign Application Priority Data

Jun. 26, 1985 [JP] Japan ................................ 60-137825
Oct. 21, 1985 [JP] Japan ................................ 60-236176

[51] Int. Cl.$^4$ ............................................. B01J 13/02
[52] U.S. Cl. ............................... 264/4.7; 428/402.21; 428/914; 503/213; 503/215
[58] Field of Search ..................... 264/4.7; 428/402.21

[56] References Cited

U.S. PATENT DOCUMENTS 4,328,119  5/1982  Iwasaki et al. ................... 264/4.7
4,574,110  3/1986  Asano et al. ..................... 264/4.7 X

*Primary Examiner*—Richard D. Lovering
*Attorney, Agent, or Firm*—Howard C. Miskin

[57] ABSTRACT

A process for manufacturing microcapsules by dissolving or dispersing microcapsule contents in an aqueous solution of acrylic acid-methacrylic acid copolymer and/or acrylic acid-itaconic acid copolymer, then polymerizing urea and/or melamine and formaldehyde in the solution or dispersion adjusted to pH 2.5~6.0, and forming film of urea-formaldehyde copolymer, melamine-formaldehyde copolymer, or urea-melamine-formaldehyde copolymer around capusle contents.

Microcapsules manufactured by this process are useful for colors for carbonless paper or thermo-changeable colors.

12 Claims, No Drawings

MICROCAPSULE MANUFACTURE

BACKGROUND OF THE INVENTION

This invention is related to a process for manufacturing microcapsules, which are particularly useful for thermo-changeable color ink changing color when raising or lowering temperatures from room to specified temperature or for color ink for carbonless paper.

Further, this invention can be applied to a process for manufacturing capsules of perfumes, agricultural chemicals, and curing agents for adhesives.

Up to now, there has been many processes for manufacturing capsules for thermo-changeable color ink or carbonless paper ink. Particularly, a process for forming film from urea- or melamine-formaldehyde copolymer using ethylenemaleic anhydride copolymer as a system modifier (patent announcement No. Showa 54-16949) has been widely used.

However, when applying the microcapsules manufactured by the above-mentioned process to thermo-changeable color ink, the marked differences in temperature were observed between the brightness of changed color, the color change in raising temperature, and the color return in lowering temperature.

The present invention provides a process for manufacturing capsules wherein the above-mentioned defects are improved, the manufacturing process is shortened, the capsules of uniform particle size are gained, and no deterioration of dyestuff occurs.

SUMMARY OF THE INVENTION

This invention is the encapsulation of hydrophobic, substantially involatile organic compounds in the film of urea-, melamine-, or urea-melamine-formaldehyde copolymer. After dissolving or dispersing leuko dyestuffs, perfumes, agricultural chemicals, and curing agents in the hydrophobic, substantially involatile organic compounds, they are enmicrocapsulated, and the capsules have good preservation stability, and are applied as thermo-changeable color ink, carbonless ink, agricultural chemicals, and adhesives.

The hydrophobic, substantially involatile organic compounds usable in the invention are indicated as examples in the following. According to the use objects of microcapsules and to the solubility or dispersibility of the solutes dissolved or dispersed in the compounds, the compounds are appropriately selected.

Alcohols: n-octyl-alcohol, n-nonyl-alcohol, n-decyl-alcohol, n-lauryl-alcohol, n-myristyl-alcohol, n-cetyl-alcohol, n-stearyl-alcohol, n-eicosyl-alcohol, n-docosyl-alcohol, oleyl-alcohol, cyclohexanol, benzyl-alcohol, etc.

Esters: lauryl-caproate, octyl-caprate, butyl-laurate, dodecyl-laurate, hexyl-myristate, myristyl-myristate, octyl-palmitate, stearyl-palmitate, butyl-stearate, cetyl-stearate, lauryl-behenate, cetyl-oleate, butyl-benzoate, phenyl-benzoate, dibutyl-sebatate, etc.

Ketones: cyclohexanone, acetophenone, benzophenone, dimyristyl-ketone, etc.

Ethers: dilauryl-ether, dicetyl-ether, diphenyl-ether, ethyleneglycol-monostearyl-ether, etc.

Fatty acids: caproic-acid, caprylic-acid, capric-acid, lauric-acid, myristic-acid, palmitic-acid, stearic-acid, arachidic-acid, behenic-acid, lignoceric-acid, cerotic-acid, palmitoleic-acid, oleic-acid, ricinoleic-acid, linoleic-acid, linolenic-acid, eleostearic-acid, erucic-acid, etc.

Acid amides: capric-amide, caprylic-amide, lauric-amide, myristic-amide, palmitic-amide, stearic-amide, behenic-amide, oleic-amide, benzamide, etc.

Hydrocarbons: aliphatic hydrocarbons such as decane, dodecane, undecane, etc. aromatic hydrocarbons such as naphthalene, anthracene, diphenylmethane, etc. alicyclic hydrocarbons such as decalin, pinene, bicyclohexyl, etc. mixed solvents of above hydrocarbons being on sale as light oil or kerosene.

Acrylic acid-methacrylic acid copolymer usable in this invention is $1:0.5 \sim 3$ in the mole ratio of acrylic acid to methacrylic acid, and $10,000 \sim 500,000$ in the average molecular weight.

And, acrylic acid-itaconic acid copolymer usable in the invention is $1:0.5 \sim 3$ in the mole ratio of acrylic acid to itaconic acid, and $10,000 \sim 500,000$ in the average molecular weight, and for actual use, Jurimer-50P or 10P-2 mass produced in Nihon Junyaku Co. Ltd. is conveniently used.

When using urea-formaldehyde copolymer as a film forming agent in the invention, it is preferable to use polyoxy phenol as a encapsulation accelerating agent. As the polyoxy phenols, dioxy phenols such as catechol, resorcin, hydroquinone, orcin, etc. or the derivatives and trioxy phenols such as pyrogallol, furoroglucin, gallic acid, etc. or the derivatives are indicated as examples, preferably resorcin, orcin, gallic acid.

In the invention, polyanionic macro-molecules can be added at need as microcapsules stabilizing agents, in which sodium salt of carboxymethylcellulose, sulfonated polyvinyl-alcohol, carboxylated polyvinyl-alcohol, maleic anhydride series resin, sodium alginate, etc. are indicated as examples.

In the invention, a variety of solutes is dissolved or dispersed in the hydrophobic, substantially involatile organic compounds in microcapsules according to the object, wherein leuko dyestuffs are used as solutes when the capsules are used for thermo-changeable color ink or the coloring agents for carbonless paper ink.

Leuko dyestuffs usable in the invention are indicated as examples in the following.

Triphenylmethane phthalides: Crystal-violet-lactone, malachite-green-lactone, etc.

Fluoranes: 3,6-diethoxy-fluorane, 3-dimethylamino-6-methyl-7-chlor-fluorane, 1,2-benz-6-diethylamino-fluorane, 3-diethylamino-7-methoxy-fluorane, etc.

Phenothiazines: benzoyl-leukomethylene-blue, methyl-leukomethylene-blue, ethyl-leukomethylene-blue, methoxybenzoyl-leukomethylene-blue, etc.

Indolyl phthalides: 2-(phenyliminoethanezylidene)-3,3-dimethyl-indoline, etc.

Spiropyrans: 1,3,3-trimethyl-indolyno-7'-chlor-$\beta$-naphtho-spiropyran, di-$\beta$-naphtho-spiropyran, benzo-$\beta$-naphtho-isospiropyran, xantho-$\beta$-naphtho-spiropyran, etc.

Leuko-auramines: N-acetyl-auramine, N-phenyl-auramine, etc.

Rhodamine lactams: Rhodamine B lactam, etc.

In using microcapsules as perfumes, not only dissolving or dispersing perfume ingredients in the hydrophobic, substantially involatile organic compounds but also encapsulating perfume ingredients as the hydrophobic, substantially involatile organic compounds is possible. In manufacturing microcapsules by the invention, capsule contents is prepared from the hydrophobic, substantially involatile organic compounds to be encapsulated, or by dissolving or dispersing solutes such as leuko dye-stuffs in the said compounds according to the objects.

When the film material is a urea-formaldehyde copolymer, per capsule contents 100 weight parts (hereafter, weight parts are simply described as parts.), 3~20%, preferably 3~10%, aqueous solution of acrylic acid-methacrylic acid copolymer and/or acrylic acid-itaconic acid copolymer 1~40 parts, preferably 3~20 parts, is prepared, and urea 3~10 parts and, if necessary, polyoxy phenol 0.1~2 parts as an encapsulation accelerating agent are added, and after warming to 50° C., the solution is adjusted to pH 2.5~6.0 with alkali to prepare A solution.

With warming A solution at ca 50° C., capsule contents is added, and the contents is emulsified in A solution by stirring with a homomixer at 2,000~10,000 r.p.m. for 5~10 min. Under this condition the particle diameter of contents becomes 2~8μ. Then, formalin (4.5~90 parts as 37% formalin) is added, and the solution is stirred under the condition similar with when emulsifying, and slowly stirred with a fan at 60°~80° C. for 2 hr, and cooled to 20°~30° C. to complete encapsulation. If necessary, by removing moisture with spray drying, solid capsules may be prepared.

When film material is a urea-melamine-formaldehyde copolymer, melamine 10 g or less is added with the formalin addition mentioned above.

When the film material is a melamine-formaldehyde copolymer, 3~20%, preferably 3~10%, aqueous solution of acrylic acid-methacrylic acid copolymer and/or acrylic acid-itaconic acid copolymer 1~40 parts, preferably 3~20 parts, is prepared, and after warming to 50° C., the solution is adjusted to pH 2.5~6.0 with alkali to prepare A solution.

With warming A solution at ca 50° C., capsule contents are added, and the contents are emulsified in A solution by stirring with a homomixer at 2,000~10,000 r.p.m. for 5~10 min. Then, 37% formalin 4~60, preferably 5~25, parts, and melamine 2~20, preferably 3~7, parts are added, and the solution is stirred under the condition similar with when emulsifying, and slowly stirred at 60°~80° C. for 2 hr, and cooled to 20°~30° C. to complete encapsulation.

In the above-mentioned cases, the mole ratio of urea-polyoxyphenol-formaldehyde in urea-formaldehyde, of melamine-formaldehyde, and of urea-melamine-formaldehyde is respectively 1:0.01~0.2:1~3 mol, 1:2~6 mol, and 1:0.1~1:1.5~6 mol.

The excess of acrylic acid-methacrylic acid copolymer and/or acrylic acid-itaconic acid copolymer to the capsule contents causes the poor stability of capsule preservation and results in the capsule aggregation due to high viscosity. If it is too little, the capsule contents is unstable for emulsifying, being difficult to be encapsulated. The excess of film forming material to the capsule contents results in the capsule aggregation due to high viscosity. If it is too little, the formed capsule film is brittle. The addition of urea and/or melamine, polyoxy phenol, and alkali to A solution in the beginning indicates the similar effects with the addition in the aqueous solution of acrylic acid-methacrylic acid copolymer or acrylic acid-itaconic acid copolymer after emulsifying the capsule contents.

DESCRIPTION OF THE PREFERRED EMBODIMENTS

The preferred embodiments are indicated in the following for further clarification of the invention. The invention is not restricted by these embodiments.

EXAMPLE 1

Acrylic-acid-methacrylic acid copolymer (average molecular weight ca 80,000) 5 g, urea 6 g, and resorcin 0.7 g are added to water 95 g and warmed to 50° C. to dissolve, and pH is adjusted to 3.7 with 20% caustic soda aqueous solution to prepare A solution.

Crystalviolet-lactone 4 g is dissolved in Nisseki Hisol (Nihon Sekiyu Co. Ltd.) 90 g by heating to prepare B solution. B solution is added to A solution kept at 50° C., and stirred with a homomixer at 3,000 r.p.m. for 10 min. to emulsify, the particle diameter becoming average 5.0μ. 37% formalin 16 g is added to the solution, and after stirring, the solution is slowly stirred for 3 hr at 60° C., and slowly cooled to gain microcapsules.

The paper applied this microcapsules slurry with air spray can be utilized as carbonless paper developing blue color.

EXAMPLE 2

Acrylic acid-methacrylic acid copolymer (average molecular weight ca 100,000) 80 g is dissolved in water 90 g, and pH is adjusted to 4.5 with 20% caustic soda aqueous solution to prepare A solution. 3-diethylamino-6-methyl-7-anilinofluorane 5 g is dissolved in KMC-113 (alkyl naphthalene series compound made of Kureha Kagaku Co. Ltd.) 100 g by heating to prepare B solution. B solution is added to A solution kept at 50° C., and stirred with a homomixer at 5,000 r.p.m. for 5 min. to emulsify. Melamine 5 g in 37% formalin 20 g dissolved by heating at 60° C. is added to the mixed solution kept at 60° C., and after stirring, the solution is slowly stirred for 2 hr to gain microcapsules of average particle diameter 4μ utilized as carbonless paper ink developing black color.

EXAMPLE 3

| | |
|---|---|
| A solution acrylic acid-methacrylic acid copolymer (average molecular weight ca 60,000) | 6 g |
| urea | 6 g |
| resorcin | 0.9 g |
| water | 95 g |
| B solution lauric acid | 50 g |
| myristic acid | 25 g |
| palmitic acid | 25 g |
| bisphenol A | 4 g |
| 3-diethylamino-6-methyl-7-chlorofluorane | 2 g |
| using B solution 90 g | |
| Emulsifying condition homomixer 4,500 r.p.m. for 8 min. | |
| pH adjustment with 20% caustic soda pH 3.6 | |
| Film forming addition 37% formaline | 16 g |

By operating similarly with example 1 under the above condition, microcapsules utilized as thermochangeable color ink, reversible red⟷colorless at 27°~31° C., are gained.

EXAMPLE 4

| | |
|---|---|
| A solution acrylic acid-methacrylic acid copolymer (average molecular weight ca 120,000) | 3 g |
| water | 97 g |
| B solution myristic acid | 100 g |

-continued

| bisphenol A | 2 g |
| --- | --- |
| bisphenol Z | 1 g |
| 3-ethylphenylamino-7-methylphenylamino-fluorane | 1 g |
| using B solution 90 g | |
| Emulsifying condition homomixer 6,000 r.p.m. for 6 min. | |
| pH adjustment with 20% caustic soda pH 4.6 | |
| Film forming material melamine | 4 g |
| 37% formalin | 20 g |

By operating identically with example 1 with the exception that melamine is also added with the addition of 37% formalin, microcapsules utilized as thermochangeable color, reversible green←→colorless at 46°~52° C., are gained.

EXAMPLE 5

| A solution acrylic acid-methacrylic acid copolymer (average molecular weight ca 100,000) | 3 g |
| --- | --- |
| Urea | 7 g |
| resorcin | 0.9 g |
| water | 96 g |
| B solution 3-diethylamino-6-methyl-7-chlorofluorane | 1 g |
| Antigene W [1, 1-bis-(4-hydroxyphenyl)-cyclohexane] | 4 g |
| lauric acid | 55 g |
| myristic acid | 25 g |
| palmitic acid | 20 g |
| using B solution 90 g | |
| Emulsifying condition homomixer 2,000 r.p.m. for 14 min. | |
| pH adjustment with 20 wt % caustic soda pH 3.4 | |
| Film forming addition material melamine | 1.5 g |
| 37% formalin | 24 g |

By operating identically with example 4, microcapsules utilized as thermo-changeable color, reversible red←→colorless at 22°~26° C., are gained.

EXAMPLE 6

Jurimer-50P (Nihon Junyaku Co. Ltd., acrylic acid-itaconic acid copolymer, average molecular weight ca 200,000) 5 g, urea 6 g, and resorcin 0.9 g are dissolved in water 95 g to prepare A solution.

Crystalviolet-lactone 3 g is dissolved in KMC-113 (Kureha Kagaku Co. Ltd., naphthalene series solvent) 110 g by heating to prepare B solution.

B solution 80 g is added to A solution kept at 50° C., and stirred with a homomixer at 5,000 r.p.m. for 7 min., the particle diameter in B solution becoming 2~5μ.

Then, 20% caustic soda aqueous solution is dropped to adjust pH to 4.0, and further 37% formalin 16 g is added, and after stirring, the solution is stirred for 2 hr at 55° C. to gain microcapsules. The paper applied this microcapsules slurry with air spraying can be utilized as carbonless paper developing blue color.

EXAMPLE 7

Jurimer-10P-2 (Nihon Junyaku Co. Ltd., acrylic acid-itaconic acid copolymer, average molecular weight ca 50,000) 10 g is dissolved in water 90 g to prepare A solution.

3-diethylamino-6-methyl-7-anilinofluorane 5 g is dissolved in Nisseki Hisol SAS-296 (Nihon Sekiyukagaku Co. Ltd., diphenylmethane series compound) 100 g by heating to prepare B solution.

B solution is added to A solution kept at 50° C., and stirred with a homomixer at 7,500 r.p.m. for 5 min., the particle diameter in B solution becoming 4~6μ.

Into the above emulsion, 20% caustic soda aqueous solution is dropped to adjust pH to 3.5, and with keeping 60° C., melamine 5 g and 37% formalin 15 g is added, and after stirring, the solution is stirred for 2 hr at 55° C. to gain microcapsules.

This microcapsules can be utilized as a color developer for carbonless paper developing black.

EXAMPLE 8

| A solution Jurimer-50P (Nihon Junyaku Co. Ltd.) | 5 g |
| --- | --- |
| urea | 8 g |
| resorcin | 0.8 g |
| water | 95 g |
| B solution myristic acid | 100 g |
| Bisphenol A | 4 g |
| Crystalviolet-lactone | 2 g |
| using B solution 90 g | |
| Emulsifying condition homomixer 8,000 r.p.m. for 5 min. | |
| pH adjustment with 20% caustic soda pH 5.0 | |
| Film forming addition material 37% formalin | 16 g |

By operating identically with example 6, micro-capsules utilized as thermo-changeable color, reversible violet←→colorless at 46°~52° C., are gained.

EXAMPLE 9

| A solution Jurimer-50P (Nihon Junyaku Co. Ltd.) | 7 g |
| --- | --- |
| water | 93 g |
| B solution lauric acid | 100 g |
| Bisphenol A | 4 g |
| O-DCF (Hodogaya Kagakukogyo Co. Ltd., fluorane dyestuff) | 2 g |
| Using B solution 100 g | |
| Emulsifying condition homomixer 9,000 r.p.m. for 5 min. | |
| pH adjustment with 20% caustic soda pH 4.2 | |
| Film forming addition material melamine | 4 g |
| 37% formalin | 12 g |

By operating identically with example 6 with the exception that melamine is added with 37% formalin addition, microcapsules utilized as thermo-changeable color, reversible orange←→colorless at 42°~46° C., are gained.

EXAMPLE 10

| A solution acrylic acid-itaconic acid copolymer | 6 g |
| --- | --- |
| urea | 6 g |
| resorcin | 0.6 g |
| water | 94 g |
| B solution 3-dimethylamino-7,8-benzofluorane | 0.5 g |
| 3-dimethylamino-5-methyl-7-dibenzylaminofluorane | 1.5 g |
| Nocrac 300 [4.4'-thio-bis-(6-tert-butyl-3-methylphenol)] | 4 g |
| capric acid | 30 g |
| lauric acid | 30 g |
| myristic acid | 40 g |
| using B solution 90 g | |
| Emulsifying condition homomixer 3,500 r.p.m. for 10 min. | |
| pH adjustment with 20% caustic soda pH 3.8 | |
| Film forming addition material melamine | 1.2 g |
| 37% formaline | 18 g |

By operating identically with example 9, microcapsules utilized as thermo-changeable color, reversible black←→colorless at 16°~22° C., are gained.

The compositions of B solution containing thermochangeable colors are indicated as examples in the following Table 1.

TABLE 1

| Exp No. | Component (A) | Component (B) | Component (C) | Changing color temp. | Color |
|---|---|---|---|---|---|
| 1 | PSD-O (2)[1] | bis-phenol-A (4) | myristic acid (90) | 46~52 | Orange |
| 2 | CVL (3)[2] | bis-phenol-F (7) | lauric acid (45) myristic acid (30) palmitic acid (25) | 29~3 | Blue |
| 3 | PSD-P (2)[3] | bis-phenol-C (8) | capric acid (40) lauric acid (30) myristic acid (30) | 10~15 | Red |
| 4 | PSD-150 (2)[4] | bis-phenol-A (8) | lauric acid (40) myristic acid (60) | 33~37 | Black |
| 5 | PSD-G (2)[5] | Antigene W[8] (5) | palmitic acid (100) | 60~65 | Green |
| 6 | PSD-P (1) | Nocrac 300[9] (2) | myristic acid (20) palmitic acid (30) stearic acid (50) | 48~52 | Red |
| 7 | CVL (4) | bis-phenol-F (8) | lauric acid (100) | 42~46 | Blue |
| 8 | ATP[6] (3) | Nocrac 300 (10) | lauric acid (20) myristic acid (40) palmitic acid (40) | 36~41 | Green |
| 9 | PSD-V[7] (2) PSD-P (0.5) | bis-phenol-A (6) | myristic acid (10) palmitic acid (15) stearic acid (75) | 57~62 | Red |
| 10 | CVL (3) | bis-phenol-A (4) bis-phenol-C (3) | caprylic acid (20) capric acid (40) lauric acid (40) | −1~5 | Blue |
| 11 | PSD-R (1) | bis-phenol-A (2) Hitanol 1140[10] (1) | lauric acid (20) myristic acid (30) palmitic acid (50) | 40~45 | Pink |
| 12 | PSD-150 (2) PSD-G (1.5) | Antigene W (8) | palmitic acid (45) stearic acid (30) arachic acid (25) | 52~57 | Black |
| 13 | ATP (2) | Nocrac 300 (5) | lauric acid (50) myristic acid (25) palmitic acid (25) | 27~31 | Green |
| 14 | PSD-0 (2) | bis-phenol-A (6) | capric acid (60) lauric acid (20) myristic acid (20) | 5~11 | Orange |
| 15 | PSD-P (0.5) CVL (2) | Antigene W (7) | stearic acid (20) arachic acid (20) behenic acid (60) | 65~71 | Violet |

REMARK
[1]PSD-O: 3-chloro-6-cyclohexylaminofluorane
[2]CVL: Crystal Violet lactone
[3]PSD-P: 3-diethylamino-7,8-benzofluorane
[4]PSD-150: 3-cyclohexylmethylamino-6-methyl-7-phenylaminofluorane
[5]PSD-G: 3-diethylamino-5-methyl-7-dibenzylaminofluorane
[6]ATP: 3-ethylphenylamino-7-methylphenylaminofluorane
[7]PSD-V: 3-diethylamino-6-methyl-7-chlorofluorane
[8]Antigene W: 1,1-bis-(4-hydroxyphenyl)-cyclohexane
[9]Nocrac 300: 4,4'-thio-bis-(6-ter-butyl-3-methylphenol)
[10]Hitanol 1140: phenyphenol resin of a M.P. of 126°~145° C.

We claim:

1. A microencapsulating method comprising emulsifying a filling including a hydrophobic substantially involatile organic compound, an electron donor organic coloring compound and a phenol hydroxide compound in a 3% to 20% by weight aqueous solution of acrylic acid-methacrylic acid copolymer consisting of acrylic acid and methacrylic acid monomers and/or acrylic acid-itaconic acid-copolymer and polymerizing in said emulsion urea and/or melamine with formaldehyde at a pH between 2.5 and 6.0 to form a capsule film of urea-formaldehyde copolymer or melamine-formaldehyde copolymer or urea-melamine-formaldehyde copolymer microencapsulating said filling.

2. The method of claim 1 wherein said filling includes a leuko dyestuff.

3. The method of claim 1 wherein the mole ratio of acrylic acid to methacrylic acid and of acrylic acid to itaconic acid in the respective copolymers thereof is between 1:0.5 and 1:3.

4. The method of claim 1 wherein the average molecular weights of said acrylic acid-methacrylic acid copolymer and acrylic acid-itaconic acid copolymer respectively is between 10,000 and 500,000.

5. The method of claim 1 wherein an encapsulating accelerating agent is added to said aqueous solution.

6. A micro-capsulization method characterized in that in a 3% to 20% by weight aqueous solution of an acrylic acid-methacrylic acid copolymer consisting of acrylic acid and methacrylic acid monomers and/or acrylic acid-itaconic acid copolymer as a system modifier is emulsified a solution or dispersion of a filling including a fatty acid with a carbon number of at least 8, an electron donor organic coloring compound and a compound having phenolic hydroxide group/s, urea and/or melamine and formaldehyde are added and polymerization effected at a pH of 2.5–6.0 whereby particles of said filling are microencapsulated in a film of urea-formaldehyde copolymer, melamine-formaldehyde copolymer or urea-melamine-formaldehyde copolymer.

7. The method of claim 6 wherein said filling is prepared by dissolving or dispersing said organic coloring compound and said phenolic hydroxide compound in said fatty acid.

8. The process for manufacturing of claim 6 wherein the system modifier is acrylic acid-methacrylic acid copolymer consisting of acrylic acid and methacrylic acid monomers.

9. The process for manufacturing of claim 6 wherein the system modifier is acrylic acid-itaconic acid copolymer consisting of acrylic acid and itaconic acid monomers.

10. The process for manufacturing of any of claims 8, 9 or 6 wherein the capsule film is urea-formaldehyde copolymer.

11. The process for manufacturing of any of claims 8, 9 or 6 wherein the capsule film is melamine-formaldehyde copolymer.

12. The process for manufacturing of any of claims 8, 9 or 6 wherein the capsule film is urea-melamine-formaldehyde copolymer.

* * * * *